United States Patent
Becker et al.

(10) Patent No.: US 9,764,759 B2
(45) Date of Patent: Sep. 19, 2017

(54) ELECTROHYDRAULIC STEER-BY-WIRE STEERING SYSTEM

(71) Applicant: Deere & Company, Moline, IL (US)

(72) Inventors: Manfred Becker, Beindersheim (DE); Nicolai Tarasinski, Frankenthal (DE)

(73) Assignee: DEERE & COMPANY, Moline, IL (US)

( * ) Notice: Subject to any disclaimer, the term of this patent is extended or adjusted under 35 U.S.C. 154(b) by 29 days.

(21) Appl. No.: 14/943,793

(22) Filed: Nov. 17, 2015

(65) Prior Publication Data

US 2016/0068182 A1    Mar. 10, 2016

Related U.S. Application Data

(63) Continuation of application No. PCT/EP2014/058217, filed on Apr. 23, 2014.

(30) Foreign Application Priority Data

May 22, 2013   (DE) .............................. 102013209467

(51) Int. Cl.
   *B62D 5/06*   (2006.01)
   *B62D 5/18*   (2006.01)
   *B62D 5/00*   (2006.01)
   *B62D 5/065*  (2006.01)

(52) U.S. Cl.
   CPC .............. *B62D 5/18* (2013.01); *B62D 5/001* (2013.01); *B62D 5/003* (2013.01); *B62D 5/064* (2013.01); *B62D 5/065* (2013.01)

(58) Field of Classification Search
   CPC .......... B62D 5/18; B62D 5/065; B62D 5/064; B62D 5/001
   See application file for complete search history.

(56) References Cited

U.S. PATENT DOCUMENTS

| 5,234,070 A | 8/1993 | Noah et al. |
| 5,353,685 A | 10/1994 | Snow |
| 6,145,309 A * | 11/2000 | Spillner ................. B62D 5/065 137/114 |

(Continued)

FOREIGN PATENT DOCUMENTS

| DE | 3037221 | 8/1982 |
| DE | 19946074 | 4/2001 |

(Continued)

OTHER PUBLICATIONS

DE 60307889 Translation attached.*

*Primary Examiner* — Kevin Hurley
*Assistant Examiner* — Gabriela C Craciun

(57) ABSTRACT

An electrohydraulic steer-by-wire steering system has an operator interface for specifying a turning angle, which is associated with a sensor for the acquisition of a position or movement of the operator interface. An electronic control device is connected to a first electrohydraulic circuit and to a second electrohydraulic circuit and set up in order to actuate the two electrohydraulic circuits as a function of a signal from the sensor. The system further includes a steering actuator for adjusting the turning angle of a steerable wheel. The steering actuator has two chambers each of which is connected simultaneously to the two electrohydraulic circuits.

11 Claims, 3 Drawing Sheets

(56) References Cited

U.S. PATENT DOCUMENTS

| | | | | |
|---|---|---|---|---|
| 7,694,776 | B2* | 4/2010 | Rathke | B62D 5/09 180/406 |
| 2007/0251755 | A1* | 11/2007 | Entwistle | B62D 5/003 180/417 |
| 2008/0087014 | A1* | 4/2008 | Schick | B62D 5/091 60/403 |
| 2014/0257638 | A1* | 9/2014 | Yamada | B62D 5/064 701/41 |
| 2016/0200347 | A1* | 7/2016 | Nagl | B62D 5/005 180/403 |

FOREIGN PATENT DOCUMENTS

| | | |
|---|---|---|
| DE | 10037829 | 2/2002 |
| DE | 60307889 | 8/2006 |
| DE | 102005019350 | 11/2006 |
| DE | 102006019803 | 11/2007 |
| EP | 1914150 | 4/2008 |

* cited by examiner

ELECTROHYDRAULIC STEER-BY-WIRE STEERING SYSTEM

RELATED APPLICATIONS

This application is a continuation application of International Application Serial No. PCT/EP2014/058217, which has an international filing date of Apr. 23, 2014, and which claims the benefit of German Application Ser. No. 102013209467.1, filed on May 22, 2013. The disclosures of these aforementioned applications are hereby expressly incorporated by reference in their entirety.

FIELD OF THE DISCLOSURE

This disclosure relates to an electrohydraulic steering system and more particularly to a steer-by-wire electrohydraulic steering system.

BACKGROUND

Many different types of machines, such as agricultural work vehicles, are usually steered by means of hydraulic steering systems having a continuously driven hydraulic pump that is connected via valve devices with a steering cylinder. The valve devices are hydraulically controlled by means of an operator interface (steering wheel) or sensors, for example, for the acquisition of plant rows in order to move the work vehicle on a desired path. To allow sufficiently rapid steering reactions, the conveyance volume of the continuously running hydraulic pump has to be dimensioned so that it is sufficiently large. This steering arrangement thus requires a relatively large amount of energy and contributes considerably to the losses in the powertrain of the work vehicle.

Moreover, in the case of forklifts, for example, so-called steer-by-wire steering systems are used, which by means of sensory registration of the turning position of an operator interface and of an electronic control device, adjust the turning angle of the steered wheels electromechanically, electrohydraulically or electropneumatically without mechanical connection between the operator interface and the steered wheels. Such a steering system may include a sensor that acquires the turning movements of the operator interface and transmits corresponding signals to a control device. Depending on the detected steering intention, the control device drives an electric motor whose output shaft is connected to a hydraulic pump, which in turn applies pressure to the chambers of the steering cylinder. Here, driving power for the electric motor is only needed if a turning movement is to be carried out.

In steer-by-wire steering systems, redundancy has to be provided to ensure functioning even if a component of the steering system fails. For this purpose, two electric motors and two hydraulic pumps are provided in a conventional embodiment, and the latter can be connected as desired by means of switching valves to the respective associated chamber of the steering cylinder. In the case of failure of an electric motor or of a pump, the steering cylinder is thus connected to the other pump that is still in running order. In another embodiment, the steering cylinder has four chambers, two of which are connected to one pump and the others of which are connected to the other pump. In this embodiment as well, only one of the two hydraulic circuits works at a time in each case.

Other conventional steer-by-wire steering devices from the automotive sector have two steering cylinders which are adjusted by associated electrohydraulic circuits, wherein, in normal operation, the two circuits are operated at the same time. In the case of failure, only one of the circuits is then still active for emergency operation.

In other conventional systems, it may be a disadvantage that the redundancy provided, within each case an electric motor and a hydraulic pump (and, in the embodiment with the four-chamber steering cylinder, also half of the steering cylinder), is without effect in normal operation. The steering speed and reaction is limited by the capacity of a single hydraulic circuit, which consequently has to be dimensioned to be sufficiently large so that a sufficient steering speed is achieved. The buyer thus acquires a number of expensive components and takes them along day after day in his/her vehicle although in most cases they are of no use to him/her, since they do not contribute to the steering action. This disadvantage may be avoided but at the expense of the use of two steering cylinders.

Therefore, the present disclosure provides an electrohydraulic steer-by-wire steering system which, in spite of redundancy, requires only one steering cylinder and exploits the capacity of the two hydraulic circuits in normal operation.

SUMMARY

In one embodiment of this disclosure, an electrohydraulic steer-by-wire steering system is provided with an operator interface for specifying a turning angle, which is associated with a sensor for the acquisition of a position or movement of the operator interface. An electronic control device connected to the sensor is connected to a first electrohydraulic circuit and to a second electrohydraulic circuit and set up in order to activate the two electrohydraulic circuits as a function of the signals of the sensor. A steering actuator for adjusting the turning angle of at least one steerable wheel has two chambers which, in normal operation of the steering system, are each connected to the two electrohydraulic circuits at the same time.

The steering actuator is accordingly activated in normal operation by two electrohydraulic circuits. Its two chambers are connected to the two circuits, so that the two circuits actively contribute to the steering. If one of the circuits fails, the other circuit is always still controlling the steering actuator. In this manner, the two electrohydraulic circuits are normally used for the steering, although only a single steering actuator with only two chambers is provided. In the case of failure, the steering speed is indeed reduced but still sufficient, which has the advantage that the operator can detect the failure and react with an appropriately adapted operating mode and visit a repair workshop. The present steering system thus combines the rapid steering speed of the prior steering systems having two steering cylinders with the simplicity of the prior steering system having only one steering cylinder.

In one embodiment, the electrohydraulic circuits each have an electric motor that is controlled by the control device, whose direction of rotation can be reversed, and which can be driven with a modifiable rotational speed, and a hydraulic pump conveying hydraulic fluid in the two rotation directions, the connections of which in each case are, or can be, connected to a chamber of the steering actuator. This embodiment saves energy, since the driving power for the electric motor is needed only when a turning movement actually occurs.

For the decoupling of the two electrohydraulic circuits, it is proposed to connect the connections of the hydraulic pumps in each case, such as by means of spring-loaded check valves associated with said hydraulic pumps, to the chambers of the steering actuator. As a result, particularly in the case of a failure of an electrohydraulic circuit, the other circuit still continues to be active, without the hydraulic fluid being able to flow into the failed circuit, since this is prevented by the check valves. Instead of the check valves, it is also possible to use any other isolation valves of choice which, in the case of failure, separate the affected electrohydraulic circuit from the steering actuator. For this purpose, it is possible to use, for example, conventional pressure-controlled valves which can be controlled by pressure differences between the two circuits. The check valves or isolation valves moreover can also be used in electrohydraulic circuits that have a permanently driven hydraulic pump and are connected by electromagnetic stop valves controlled by the control device, or by any other valves to the chambers of the steering actuator.

A storage tank for hydraulic fluid can be connected in each case to an inlet of the hydraulic pump for the supply of hydraulic fluid or in each case via a check valve to the two connections of the two hydraulic pumps. As a result, the hydraulic pump, when needed, can be supplied with additional hydraulic fluid, or excess hydraulic fluid can be discharged again into the storage tank.

In addition, the steering actuator-side connections (outlets) of the check valves arranged between the connections of the hydraulic pumps and the chambers of the steering actuator can each be connected to a first connection of a stop valve, the second connection of which can be connected or is connected to a storage tank for hydraulic fluid. The stop valve may be a so-called lowering brake valve. The stop valve may be controlled by the hydraulic pump-side pressure of the respective other check valve of the respective electrohydraulic circuit, or by the pressure applied at its first connection. The stop valve ensures that the pressure in the respective chamber of the steering actuator that contracts during the turning is dissipated at an appropriate flow rate, since a pressure outflow restricted through the check valve that connects the contracting chambers to the suctioning connection of the hydraulic motor, and which is now closed.

The second connections of the two stop valves can be connected via a filter to the storage tank for hydraulic fluid, with which a pressure relief valve can be connected in parallel.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
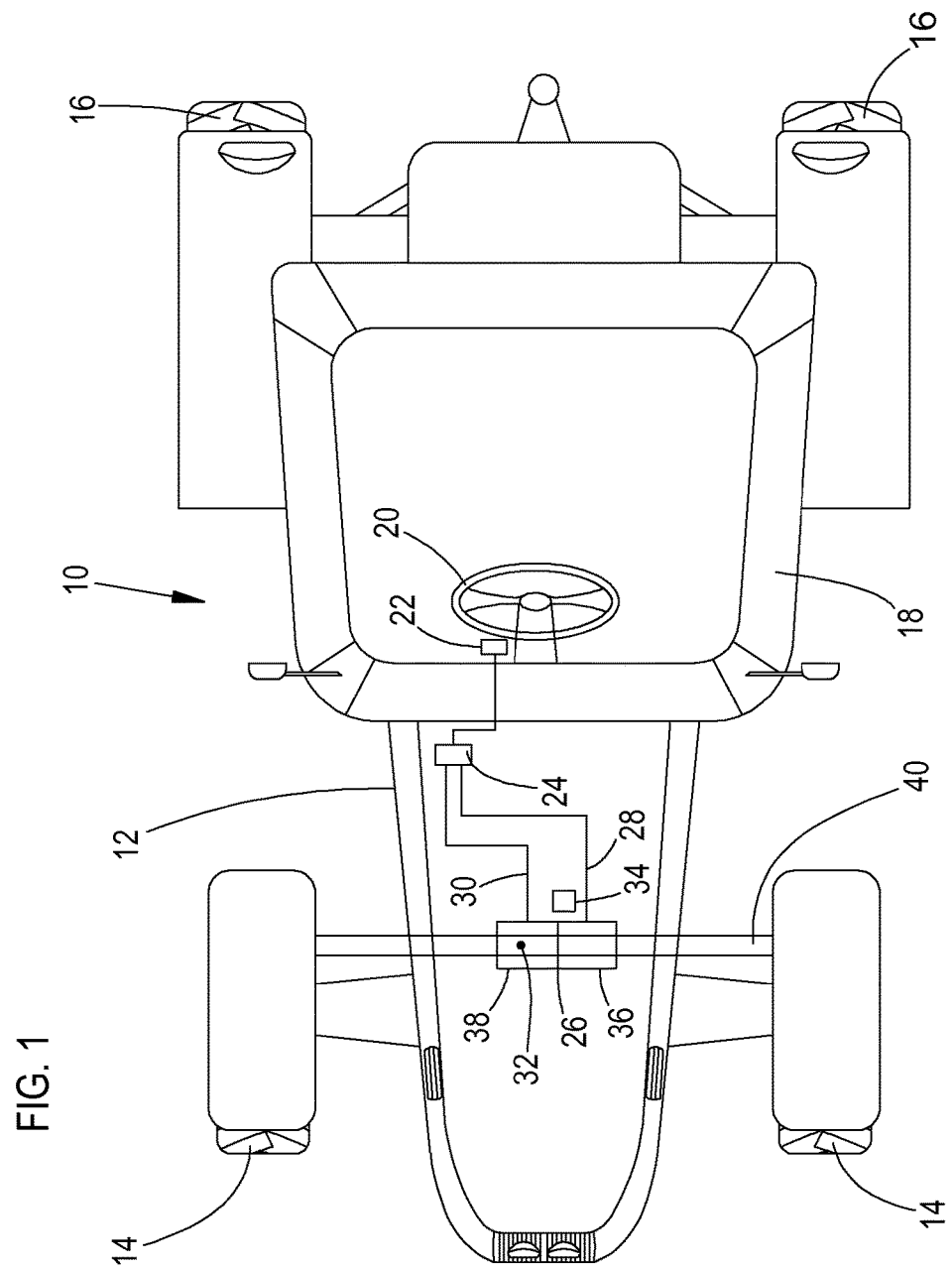
FIG. 1 is a top view of an agricultural work vehicle with an electrohydraulic steer-by-wire steering system.

FIG. 1 shows an agricultural work vehicle 10 in the form of a tractor, which has a vehicle chassis 12 which is supported on steerable front wheels 14 and driven rear wheels 16. A combustion engine (not shown) is used for driving the elements of the work vehicle 10 that can be driven. A work place for an operator is located in a cabin 18, from where the operator can specify the turning angle of the steerable wheels 14 by means of an operator interface 20 in the form of a steering wheel. The operator interface 20 works together with a sensor 22 which acquires the rotation angle of the operator interface 20 or changes of the rotation angle of the operator interface 20 about a rotation axis. The sensor 22 can be constructed, for example, as an incremental angle sensor with a light barrier or magnetic field sensors. The operator interface 20 could also be implemented as a joystick or similar device.

The sensor 22 is electrically connected to an electrohydraulic control arrangement 24, which in turn is connected by two hydraulic lines 28, 30 to the two chambers 36, 38 of a steering actuator 26 in the form of a hydraulic cylinder. The piston rods 32 of the steering actuator 26 adjust a tie rod 40 in a lateral direction, which in turn controls the angle of the steerable wheels 14 pivotably attached to a front axle 42, that is to say the turning angle. A return coupling sensor 34 reports the respective actual turning angle of the work vehicle 10 back to the control arrangement 24.

Figure 2:
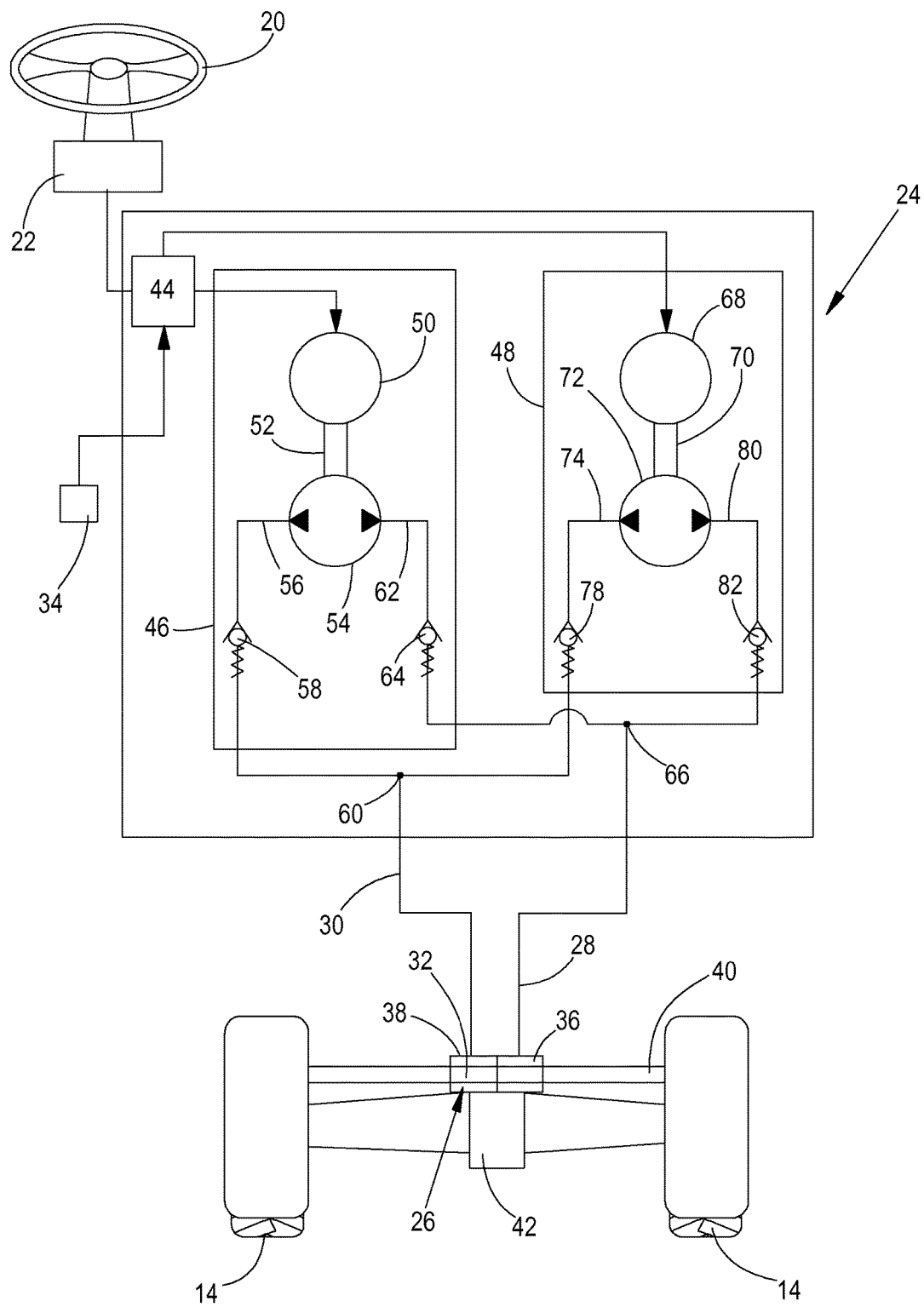
FIG. 2 is a simplified diagram of the steering system of the agricultural work vehicle of FIG. 1.

FIG. 2 shows a simplified diagram of the steering system of the work vehicle 10 of FIG. 1. The electrohydraulic control arrangement marked overall with 24 has an electronic control device 44 which receives signals pertaining to the turning angle desired by the operator from sensor 22 and, from the return coupling sensor 34, signals pertaining to the actual turning angle of the steerable wheels 14. The supply of current to the control device 44 is ensured by the on-board power supply system of the work vehicle 10. The supply of the chambers 36, 38 of the steering actuator 26 with hydraulic fluid occurs by means of two separate electrohydraulic circuits 46, 48.

The first electrohydraulic circuit 46 has a first electric motor 50 whose output shaft 52 is used for driving a first hydraulic pump 54. A first connection 56 of the first hydraulic pump 54 is connected via a spring-loaded check valve 58 to a connection point 60 to which a first hydraulic line 30 is also connected, which leads to the first chamber 38 of the steering actuator 26. A second connection 62 of the first hydraulic pump 54 is connected via a spring-loaded check valve 64 to a connection point 66 to which a second hydraulic line 28 is also connected, which leads to the second chamber 36 of the steering actuator 26.

The second electrohydraulic circuit 48 may have a second electric motor 68 whose output shaft 70 is used for driving a second hydraulic pump 72. A first connection 72 of the second hydraulic pump 54 is connected via a spring-loaded check valve 78 to the connection point 60 to which the first hydraulic line 30 is also connected, which leads to the first chamber 38 of the steering actuator 26. A second connection 80 of the second hydraulic pump 72 is connected via a spring-loaded check valve 82 to the connection point 66 to which the second hydraulic line 28 is also connected, which leads to the second chamber 36 of the steering actuator 26.

The electric motors 50, 68 can be driven in two rotational directions and at modifiable speeds. For example, they can be implemented as a direct-current motor. Analogously, the two hydraulic pumps 54, 72 can convey their hydraulic fluid in the two directions. The hydraulic pumps 54, 72 can be implemented as fixed displacement pumps or vane pumps. Accordingly, if the operator turns the operator interface 20 to the right, in order to steer to the right (see FIG. 1), the control unit 44 causes the electric motors 50, 68 to turn in a rotation direction which leads to filling of the second chamber 36 of the steering actuator 26 and emptying of the first chamber 38 of the steering actuator 26. Analogously, the control unit 44 causes the electric motors 50, 68 to turn in a rotation direction which leads to filling of the first chamber 38 of the steering actuator 26 with the hydraulic fluid and emptying of the second chamber 36 of the steering actuator 26. Here, the signal of the return coupling sensor 34 is used in order to ensure that the actual turning angle coincides with the desired turning angle. The adjustment speed of the steering actuator 26 is determined by the predetermined target speed at which the operator operates the operator interface. The speed of the electric motors 50, 68 and thus the flow rate in the hydraulic lines 28, 30 depend on this target speed. As a result of the parallel operation of the two electrohydraulic circuits 46, 48, one achieves in normal operation, i.e., when the two electrohydraulic circuits 46, 48 are operational, a relatively high steering speed. The applying of pressure to the single steering actuator 26 by means of only two chambers 38, 36 acting in opposite steering directions keeps the expense within manageable limits.

The check valves 58, 64, 78, 82 each open only when a higher pressure is applied at their inlets, i.e., indicated at the top of FIG. 2, which are connected to the connections 56, 62, 74, 80 of the hydraulic pumps 54, 72, than the pressure at the outlets indicated at the bottom of the drawing. As a result, in the case of a failure of one of the electrohydraulic circuits 46, 48, failure of the other electrohydraulic circuit 48, 46 can be prevented. In the case of failure of an electrohydraulic circuit 46 or 48, the steering system accordingly still remains functional, although with half the steering power. This has the additional advantage that the user can easily notice the failure and react to it. Other valves (not included in the drawing of FIG. 2) may provide a return flow of the hydraulic fluid from the respective contracting chamber of the steering actuator 26 toward the suction-side connection of the hydraulic pumps 54, 72. In one non-limiting example, wherein closed circuits 46, 48, as diagrammatically represented in FIG. 2, or open circuits 46, 48 are conceivable; the hydraulic fluid from the respective contracting chamber of the steering actuator 26 may go into a storage tank 84 and from there reach a suction-side connection of the hydraulic pumps 54, 72, as shown in FIG. 3.

Figure 3:
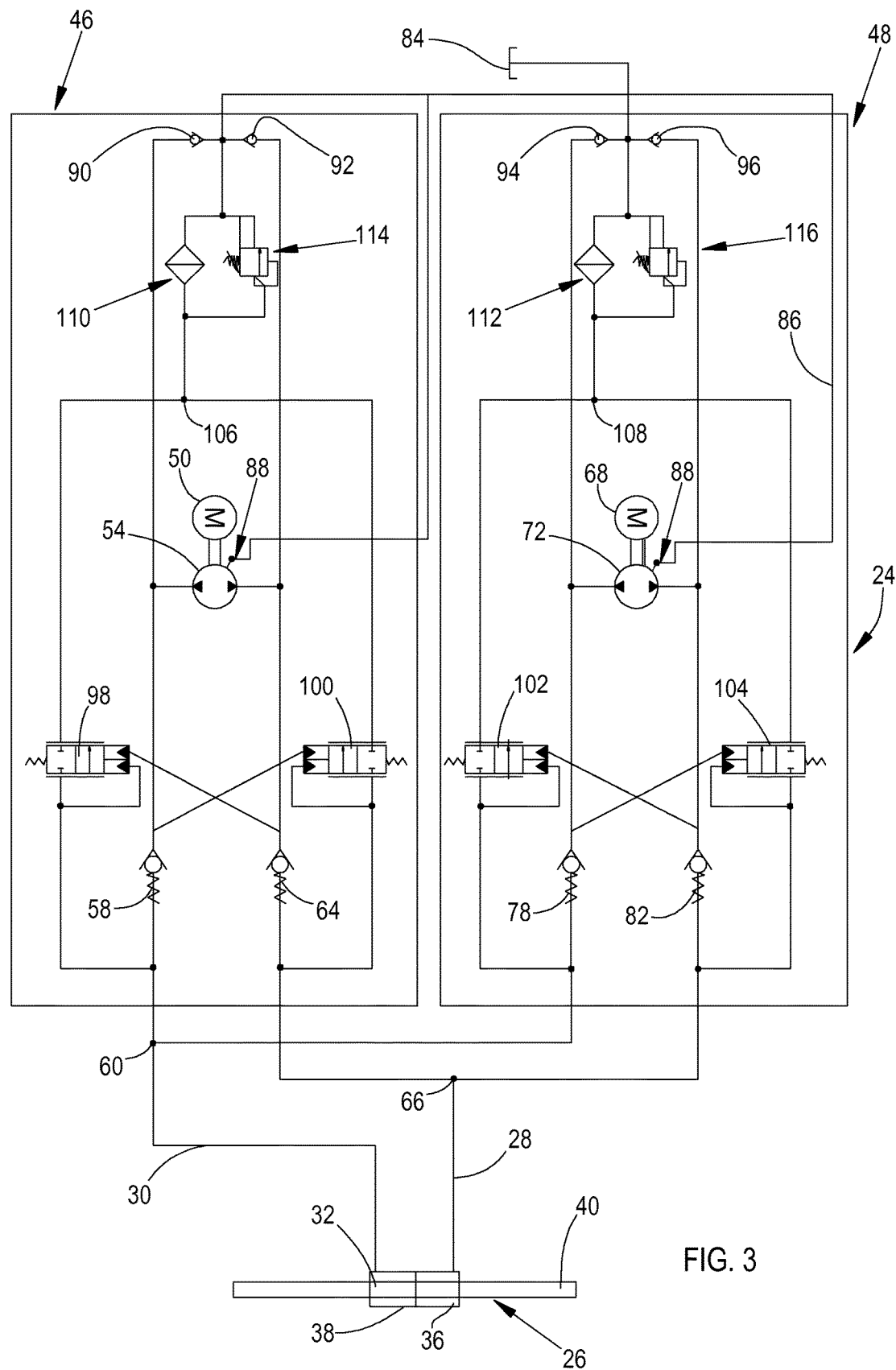
FIG. 3 is a hydraulic diagram of the steering system of the agricultural work vehicle of FIG. 1.

FIG. 3 shows the electrohydraulic control arrangement of FIG. 2 with further refinements. A storage tank 84 for hydraulic fluid is connected in each case via lines 86 to an inlet 88 of the hydraulic pumps 54, 72, by means of which, if necessary, hydraulic fluid can be supplied to the hydraulic pumps 54, 72. In addition, the storage tank 84 is connected via a check valve 90, 92, 94, 96 in each case to the two connections of the two hydraulic pumps 54, 72. If, at one of the connections of the hydraulic pumps 54, 72, a pressure is applied that is lower than that in the storage tank 84, hydraulic fluid is automatically resupplied to the affected connection of the hydraulic pump 54, 72, in order to prevent cavitation effects. The storage tank 84 can be associated with the steering system, or the storage tank of the on-board hydraulic system can also be used by the steering system, wherein the supply would have to be ensured by appropriate valves.

Moreover, in total, four stop valves 98, 100, 102, 104 implemented as proportional valves are provided. The inlets (indicated at the bottom in FIG. 3) of the stop valves 98, 100, 102, 104 are each connected to an outlet of one of the check valves 58, 64, 72 and 82. The outlets (indicated at the top in FIG. 3) of the stop valves 98, 100, 102, 104 are each connected to one of two connection points 106, 108, which in turn are connected via a filter 110, 112 and a pressure relief valve 114, 116 connected parallel to the filter 110, 112, to the storage tank 84. The stop valves 98, 100, 102, 104, which are pretensioned by springs in the closed position, are controlled by the pressure at their inlet and by the pressure at the inlet of the respective other check valve 64, 58, 82, 78 of the respective circuit 46 or 48. For this purpose, their control chambers are connected via control lines to the inlets of the check valves 64, 58, 82, 78. The opening pressure necessary for opening the stop valve 98, 100, 102, 104 in the control chamber connected directly to the inlet of the stop valve 98, 100, 102, 104 (owing to smaller surface area) is higher than that in the control chamber connected to the respective other check valve 64, 58, 82, 78 of the respective circuit 46 or 48.

The stop valves 98, 100, 102, 104 are implemented as lowering brake valves. On the one hand, they open when the pressure at one of the connection points 60 or 66 increases and they lead the hydraulic fluid via the filter 110 or 112 (or in case of clogging of the filter 110 or 112 via the pressure relief valve 114 or 116) into the storage tank 84. As a result, a reduction of the volume of the respective chamber 38 or 36 of the steering actuator 26, which contracts during a turning movement, becomes possible, since the check valve 64, 58, 82, 78 connected to the respective contracting chamber 38 or 36 of the steering actuator 26 is closed in each case. On the other hand, the stop valves 98, 100, 102, 104 also open due to the pressure of the respective expanding chamber 38 or 36 of the steering actuator 26, which is acquired upstream of the then opening check valve 58, 64, 78, 82 and which is supplied to the control chamber of the stop valve 98, 100, 102, 104.

In normal operation, the functioning of the steering system is as follows. If no turning movement is desired, the electric motors 50, 68 and also the hydraulic pumps 54, 72 stand still and no hydraulic fluid flows and the steering actuator 26 stands still. In any case, the check valves 58, 64, 78, 92 and 90 to 96 may allow a pressure difference still remaining from a previous turning movement to be dissipated.

When the operator now operates the operator interface 20 in order to steer to the right, the control device 44 causes the electric motors 50, 68 to turn in the direction which leads to pressure building up at the connections, i.e., indicated on the left in FIG. 3, of the hydraulic motors 54 and 72. This pressure leads to the check valves 58 and 78 opening and the hydraulic fluid reaching the first chamber 38 of the steering actuator 26 via the connection point 60 and the hydraulic line 30. The piston 32 shifts to the left and the wheels 14 are steered to the right. Due to the pressure at the inlets of the check valves 58, 78 and the pressure that builds up in the contracting second chamber 36 of the steering actuator 26, which also reaches the control chambers of the stop valves 100 and 104 via the hydraulic line 28 and the connection point 66, the aforementioned stop valves open and the hydraulic fluid flows via the stop valves 100 and 104 and the filters 110, 112 or the pressure relief valves 114, 116 into the storage tank 84. The supply of the hydraulic pumps 54, 72 with hydraulic fluid occurs via the inlets 88 or the check valves 92, 96. The respective other stop valves 98, 102 and the check valves 64, 82 remain closed as a result of the lack of applied pressures sufficient for the opening.

When the operator now analogously operates the operator interface 20 in order to steer to the left, the steering device 44 causes the electric motors 50, 68 to turn in the other direction, which leads to a pressure building up at the connections of the hydraulic motors 54 and 72 indicated on the right in FIG. 3. This pressure leads to the check valves 64 and 82 opening and the hydraulic fluid reaching the second chamber 36 of the steering actuator 26 via the connection point 66 and the hydraulic line 28. The piston 32 shifts to the right and the wheels are steered to the left. Due to the pressure at the inlets of the check valves 64, 82 and the pressure that builds up in the contracting first chamber 38 of the steering actuator 26, which also reaches the control chambers of the stop valves 98 and 102 via the hydraulic line 30 and the connection point 60, said stop valves open, and the hydraulic fluid flows via the stop valves 98 and 102 and the filters 110, 112 or the pressure relief valves 114, 116 into the storage tank 84. The supply of the hydraulic pumps 54, 72 with hydraulic fluid occurs via the inlets 88 or the check valves 90, 94. The respective other stop valves 100, 104 and the check valves 58, 78 remain closed due to the lack of applied pressures that are sufficient for the opening.

In the case where one of the electrohydraulic circuits 46, 48 fails, no pressure can build up in this circuit. The check valves 58, 64, 78, 82 prevent the hydraulic fluid from flowing out of a functioning circuit into a defective circuit and they allow the further operation of the steering system with only one remaining functioning circuit. The functional failure of the defective circuit 46 or 48 can be acquired by the control device 44 by means of corresponding sensors, for example, for the rotation of the electric motors 50, 68 or the pressures in the circuit, and optionally the electric motor 50 or 68 of the defective circuit 46 or 48 is switched off automatically.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An electrohydraulic steer-by-wire steering system, comprising:
an operator interface for specifying a turning angle;
a sensor for detecting a position or movement of the operator interface;
an electronic control device connected to the sensor;
a first electrohydraulic circuit and a second electrohydraulic circuit both coupled to the control device, wherein the control device is controllable to activate the two electrohydraulic circuits as a function of a detected signal from the sensor;
a steering actuator for adjusting the turning angle of a steerable wheel, the steering actuator comprising two chambers each of which in a normal operation of the steering system is simultaneously connected to the two electrohydraulic circuits;
a first electric motor of the first electrohydraulic circuit and a second electric motor of the second electrohydraulic circuit, the first and second electric motors being controllable by the control device in two rotational directions and at variable speeds;
a hydraulic pump for conveying hydraulic fluid in the two rotational directions of the first and second electric motors, the hydraulic pump having one or more connections for coupling to at least one of the chambers of the steering actuator, where the one or more connections comprises a check valve for coupling to the at least one chamber of the steering actuator;
a storage tank for storing hydraulic fluid; and
at least one stop valve having a first connection and a second connection, wherein the first connection is coupled to the check valve, the second connection is coupled to the storage tank, and the stop valve is connected to the storage tank via a filter.

2. The steering system of claim 1, wherein the storage tank is connected to an inlet of the hydraulic pump for supplying hydraulic fluid thereto.

3. The steering system of claim 1, further comprising:
a second hydraulic pump hydraulically coupled to the second motor;
a second check valve coupled to a second chamber of the steering actuator; and
a second stop valve being coupled between the second check valve and the storage tank.

4. The steering system of claim 3, further comprising:
a third check valve and a fourth check valve;
a third stop valve and a fourth stop valve;
wherein:
the third stop valve is coupled between the third check valve and the storage tank; and
the fourth stop valve is coupled between the fourth check valve and the storage tank.

5. The steering system of claim 1, wherein the stop valve is controllable by hydraulic pressure of a second check valve or pressure at one of the connections.

6. The steering system of claim 1, further comprising a pressure relief valve connected in parallel to the filter.

7. A work vehicle, comprising:
a chassis;
at least one steerable wheel for supporting the chassis;
a cabin mounted on the chassis, the cabin including an operator control for controlling a turning angle of the at least one steerable wheel;
a sensor for detecting a position or movement of the operator control;
a control device electrically coupled to the sensor;
a first electrohydraulic circuit and a second electrohydraulic circuit both coupled to the control device, wherein the control device is controllable to activate the first and second electrohydraulic circuits as a function of a detected signal from the sensor;
a steering actuator for adjusting the turning angle of the at least one steerable wheel, the steering actuator including a first chamber and a second chamber, the first and second chambers being simultaneously connected to the two electrohydraulic circuits;
a first electric motor of the first electrohydraulic circuit and a second electric motor of the second electrohydraulic circuit, the first and second electric motors being controllable by the control device in two rotational directions and at variable speeds;
a hydraulic pump for conveying hydraulic fluid in the two rotational directions of the first and second electric motors, the hydraulic pump being coupled to at least one of the first and second chambers via a check valve;
a storage tank for storing hydraulic fluid; and
a stop valve having a first connection and a second connection, wherein the first connection is coupled to the check valve, the second connection is coupled to the storage tank, and the stop valve is connected to the storage tank via a filter.

8. The steering system of claim 7, wherein the storage tank is connected to an inlet of the hydraulic pump for supplying hydraulic fluid thereto.

9. The steering system of claim 7, further comprising:
a second hydraulic pump hydraulically coupled to the second motor;
a second check valve coupled to the second chamber of the steering actuator; and
a second stop valve being coupled between the second check valve and the storage tank.

10. The steering system of claim 9, further comprising:
a third check valve and a fourth check valve;
a third stop valve and a fourth stop valve;
wherein:
the third stop valve is coupled between the third check valve and the storage tank; and
the fourth stop valve is coupled between the fourth check valve and the storage tank.

11. The steering system of claim 7, further comprising a pressure relief valve coupled in parallel to the filter.

\* \* \* \* \*